Patented July 8, 1952

2,602,768

UNITED STATES PATENT OFFICE 2,602,768

PROCESS FOR THE MANUFACTURE OF SODIUM GLUCONATE

Charles Kenneth Crocker, Evanston, and Andrew J. Moyer and Virgil F. Pfeifer, Peoria, Ill., assignors to the United States of America as represented by the Secretary of Agriculture No Drawing. Application January 10, 1950, Serial No. 137,901

6 Claims. (Cl. 195—36)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the production of sodium gluconate by fermentation processes, and relates more particularly to a method for producing sodium gluconate directly by fermentation of a suitable medium with gluconic acid-producing organisms.

The production of gluconic acid by fermentation has been known for several years. Various methods have been described, as for example, in U. S. Patent Nos. 2,277,716 and 2,351,500. In prior art processes, exemplified by these patents, gluconic acid has been recovered in the form of its calcium salt. This was accomplished by the addition of calcium bases, such as calcium carbonate, to the fermenting medium during the fermentation. Magnesium carbonate has been employed in a similar manner. As the gluconic acid is formed in these prior processes, it is immediately neutralized on coming in contact with the calcium or magnesium ions. Gluconate salts are thus formed which have a relatively low solubility in the aqueous medium, and are recoverable from the process by relatively simple methods of crystallization due to their reduced solubility.

In prior art processes these calcium and magnesium bases had an important technical function of controlling the pH of the media within optimum limits for the production of gluconic acid by fermentation. Their function, therefore, was twofold, in that they served as buffering agents to control the hydrogen ion concentration and also served as an agency for the convenient recovery of gluconic acid in the form of its salts.

For many technical purposes, now increasing in economic importance, it is desirable to produce gluconic acid in the form of soluble salts which are readily soluble, particularly its sodium salt. Prior methods of producing sodium gluconate, however, involve the chemical conversion of salts such as calcium gluconate. The process of conversion is relatively expensive, and the sodium gluconate thus produced has a cost prohibitive for many purposes in which it is a highly desirable industrial material.

We have discovered a method for producing soluble gluconate salts, particularly sodium gluconate, directly by fermentation with gluconic acid-producing organisms whereby sodium gluconate of high purity can be produced at greatly decreased cost. Our process is applicable to fermentation with gluconic acid-producing microorganisms, such as acetobacter, and particularly fungi, such as those of the genera Aspergillus or Penicillium.

In accordance with our process a fermentation medium is employed in which gluconic acid is produced, and ions of the desired soluble gluconate salt, for example, sodium ions, are added to neutralize the gluconic acid as it is produced. The sodium ion may be added in the form of sodium bases, such as caustic soda, sodium carbonate, sodium bicarbonate, soda ash, or mixtures of these bases with other sodium salts which may or may not contain in the negative ion nutrient elements required by the organism to produce gluconic acid. Examples of supplementary sodium salts are sodium nitrate, sodium phosphate, sodium salts of organic amino acids and the like.

In contrast to the use of calcium and magnesium bases as referred to in preceding paragraphs, sodium bases are not capable of performing the function of pH control under the conditions of these prior processes. They are characterized by high solubility in the medium, so that if sufficient sodium ions were added at the outset, as is practiced in the case of the prior processes employing calcium or magnesium bases, the pH of the fermentation medium would be far greater than could be tolerated by the gluconic acid-producing organisms.

We have discovered a range of hydrogen ion concentration within which the gluconic acid-producing organisms function efficiently in the presence of sodium ions, and which if maintained in the fermentation media will result in excellent yields of sodium gluconate directly.

The pH of the fermentation medium may be maintained by the periodic addition of increments of the sodium bases employed. This may be accomplished by known methods for maintaining the hydrogen ion concentration within given limits, such as manual addition of an aqueous solution of the salts, carefully controlled drop-wise addition, or preferably the use of automatic means, such as a pH control meter, in which case the metering device is actuated so that the solution of desired sodium base is added continuously to maintain the pH within predetermined limits. The sodium gluconate may be recovered from the fermentation medium, after the reaction is completed, by evaporation and crystallization. Recovery may be conveniently accomplished by means of a conventional drum drier or other known methods.

In accordance with our invention we have discovered that the gluconic acid-producing organisms previously mentioned, heretofore utilized in the presence of calcium, magnesium, etc., salts, are capable of converting nutrient glucose into gluconic acid substantially completely in the presence of sodium ions within the limits of pH 5.0 to 7.5.

The fermentations are conducted employing aeration and agitation under submerged conditions. We have moreover discovered that the rates of agitation and aeration may vary over wide limits, depending upon the particular equipment used. It is necessary in any event to provide sufficiently vigorous agitation and aeration in order that the organisms come in contact with the nutrient medium and with oxygen. The gas used for aeration is preferably atmospheric air, sterilized to avoid contamination. It may also be oxygen or mixtures of oxygen with inert gas.

To initiate the fermentation, the organism may be added to the medium in various stages of development. For example, spores may be employed, which usually results in a saving of equipment, labor, etc. In production equipment, however, we have found it desirable to carry out the process in a semi-continuous manner. For example, the mycelium from a completed fermentation may be used to inoculate subsequent media. This procedure results in considerable saving of time and, moreover, avoids the necessity for growing the organism spores separately. Furthermore, it eliminates the germination period, since the subsequent fermentation may proceed directly.

The fermentation is carried out at temperatures of 25° to 40° C. and preferably at pressures within the range of 20 to 40 p. s. i. gage. We have found it desirable to use small amounts of foam deterents, such as octadecyl alcohol, soybean oil, and the like. The nutrient medium consists of an aqueous solution of about 15 to 40 percent glucose, which may be added in the form of commercial glucose, amylaceous conversion sirups, wood hydrolysis liquor and the like. The fermentation also requires small amounts of the various nutrient minerals, such as magnesium, potassium phosphate and the like. Also, it is desirable to have a supplementary source of organic nitrogen which may be corn steep liquor, peptone, yeast autolysate, any of the various protein-rich seed meals, corn gluten, wheat gluten and the like. For efficient recovery of sodium gluconate we prefer to employ corn steep liquor.

The following examples illustrate the invention.

*Example 1*

A medium of the following composition was made up:

| | | |
|---|---|---|
| Tap water | gal | 100 |
| Glucose | lb | 300 |
| Corn steep liquor (43 percent solids) | cc | 2100 |
| $MgSO_4 \cdot 7H_2O$ | g | 94 |
| $KH_2PO_4$ | g | 113 |
| $(NH_4)_2HPO_4$ | g | 240 |
| Urea | g | 60 |
| $H_2SO_4$ | cc | 50 |

The medium had a pH of 5.0, and it was sterilized at 250° F. As antifoam agent, one percent octadecyl alcohol was added in ethanol solution. The pH of the medium was adjusted to 6.3 by the addition of caustic soda and it was inoculated with 10 l. of an aqueous suspension containing the spores from 3,000 sq. cm. of spore-bearing mycelium of *Aspergillus niger* NRRL 3. The pH of the fermentation was kept between 5.4 and 7.4 by an automatic pH controller which supplied increments of NaOH solution automatically to keep the pH value within the stated limits. At the end of 33 hours the nutrient solution contained 0.037 percent glucose. During the fermentation air was introduced at slightly more than 30 cubic feet per minute, and the temperature of the fermentation was maintained at 33° C. At the end of the fermentation the mycelium and other solid material was separated by filtration and the sodium gluconate recovered by evaporation and crystallization. The yield was practically quantitative based on the glucose consumed.

*Example 2*

A medium of the following composition was made up:

| | | |
|---|---|---|
| Tap water | gal | 100 |
| Glucose | lb | 300 |
| Corn steep liquor (43 percent solids) | cc | 2100 |
| $MgSO_4 \cdot 7H_2O$ | g | 94 |
| $KH_2PO_4$ | g | 113 |
| Urea | g | 60 |
| $(NH_4)_2HPO_4$ | g | 240 |
| $H_2SO_4$ | cc | 100 |

The fermentation was carried out as in Example 1, with a slightly increased rate of aeration. At the end of 28½ hours the medium contained 0.89 percent glucose.

The filtered mycelium from the above fermentation was used in a subsequent fermentation employing the same nutrient medium and conditions of fermentation. The inoculation was effected by employing the mycelium press cake from the previous fermentation, blowing air through the cake for about one hour and then adding this to the sterile medium. The resulting fermentation was very rapid. For example, at the end of 16 hours glucose concentration had been reduced from 23.2 percent to 0.3 percent, thus effecting a 12-hour decrease in fermentation time.

*Example 3*

The procedure of Example 2 was repeated employing the filtered mycelium from a previous fermentation to inoculate the following medium:

| | | |
|---|---|---|
| Tap water | gal | 95 |
| Glucose | lb | 300 |
| Corn steep liquor (43 percent solids) | cc | 2100 |
| $MgSO_4 \cdot 7H_2O$ | g | 94 |
| $KH_2PO_4$ | g | 113 |
| Urea | g | 60 |
| $(NH_4)_2HPO_4$ | g | 240 |
| $H_2SO_4$ | cc | 100 |

The initial pH of the medium was 4.1, and this was adjusted to 6.0 by the addition of caustic soda. The pH was maintained between 5.5 and 6.5 by an automatic pH controller as in the previous examples. At the end of the 10½ hours the medium contained 0.2 percent glucose.

In the specific examples set forth above the sodium gluconate was recovered in yields closely approaching the theoretical based on the glucose consumed. Recovery was effected by either evaporation and crystallization of the filtered fermentation medium or by means of a drum drier.

Other recovery means will occur to those skilled in the art and are within the purview of this invention.

In Examples 2 and 3 the fermentations were discontinued when the concentration of glucose in the medium reached a value of 0.3 percent and 0.2 percent, respectively. For the purpose of determining fermentation times these values represent a practical end-point for the fermentations.

We claim:

1. Method for the production of sodium gluconate by the direct fermentation of a nutrient medium comprising glucose and a source of organic nitrogen, which comprises cultivating in said medium a gluconic acid-producing organism in the presence of sufficient sodium base to maintain the pH of the medium within the range of 5.0 to 7.5, said pH being maintained by the addition of supplementary sodium base at a rate substantially equivalent to the rate of production of gluconic acid by said organisms, and recovering sodium gluconate from the fermentation liquor.

2. Process of claim 1 in which the gluconic acid-producing organism is of the genus Aspergillus.

3. Process of claim 1 in which the sodium base is added as an aqueous solution of sodium hydroxide.

4. Method for the production of a soluble salt of gluconic acid by the direct fermentation of a nutrient medium comprising glucose and a source of organic nitrogen, which comprises cultivating in said medium a gluconic acid-producing organism in the presence of sufficient cations of the desired salt to maintain the pH of the medium within the range of 5.0 to 7.5, said pH being maintained by the supplementary addition of said cations at a rate substantially equivalent to the rate of production of gluconic acid by said organisms and recovering said soluble salt from the fermentation liquor.

5. In the fermentation production of gluconic acid comprising cultivating a gluconic acid-producing organism in a nutrient medium comprising glucose and a source of organic nitrogen, the improvement which comprises maintaining the pH of the medium within the range of 5.0 to 7.5 by the addition of a soluble base at a rate substantially equivalent to the rate of production of gluconic acid by said organisms.

6. Method of claim 4 in which the mycelium is separated and used to inoculate a subsequent gluconic acid fermentation.

C. KENNETH CROCKER.
ANDREW J. MOYER.
VIRGIL F. PFEIFER.

REFERENCES CITED

The following references are of record in the file of this patent:

UNITED STATES PATENTS

| Number | Name | Date |
| --- | --- | --- |
| 1,679,186 | Szucs | July 31, 1928 |
| 1,849,053 | Bernhauer et al. | Mar. 15, 1932 |
| 1,893,819 | Currie et al. | Jan. 10, 1933 |
| 2,006,086 | May et al. | June 25, 1935 |
| 2,351,500 | Moyer | June 13, 1944 |